F. S. SKIFF.
FLEXIBLE FAUCET CONNECTION.
APPLICATION FILED JUNE 3, 1909.
947,461.
Patented Jan. 25, 1910.
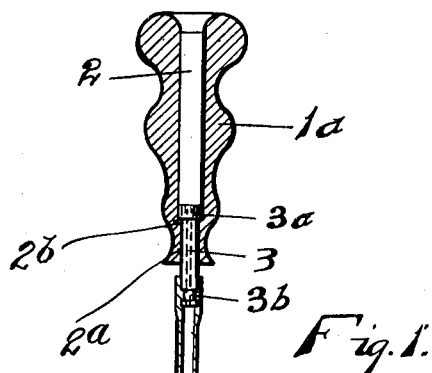
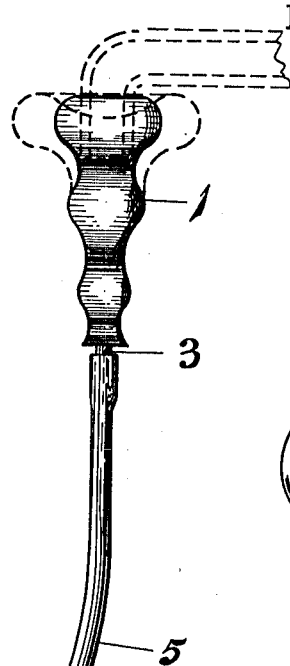
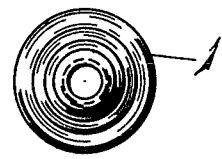
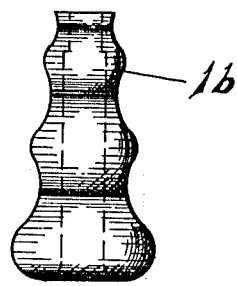
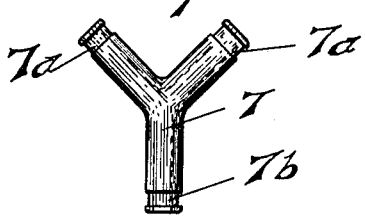
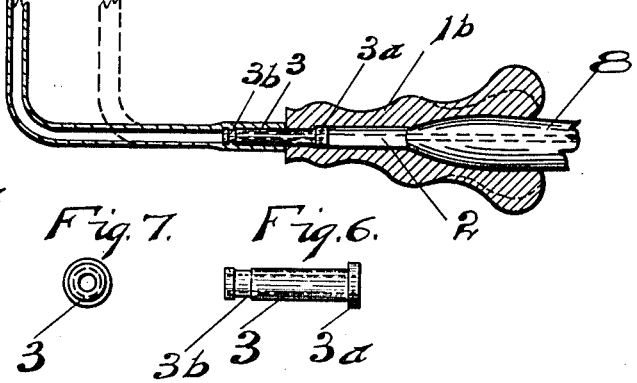
Witnesses
Ernest H. Allen.
Estylle A. Zeyss
Inventor
Frank S. Skiff
by Attorney
Thomas Bilyeu

UNITED STATES PATENT OFFICE.

FRANK S. SKIFF, OF PORTLAND, OREGON.

FLEXIBLE FAUCET CONNECTION.

947,461.   Specification of Letters Patent.   Patented Jan. 25, 1910.

Application filed June 3, 1909. Serial No. 499,954.

*To all whom it may concern:*

Be it known that I, FRANK S. SKIFF, a citizen of the United States, residing at Portland, in the county of Multnomah and State of Oregon, have invented certain new and useful Improvements in Flexible Faucet Connections, of which the following is the full and complete specification, such as will enable those skilled in the art to which it appertains to make and use the same.

This invention relates to hydraulic tooth brushes and affords a sure and ample means of connecting the hot and cold water supply as ordinarily found with the flexible conduit and thence the conduit with the hydraulic tooth brush.

The invention is fully disclosed in the following specifications of which the accompanying drawings form a part, in which, Figure 1 is a "layout" of the conduit, and illustrates the method of attaching the same to the faucets and converging them into one and thence attaching it by a suitable means to the tooth brush to be used. Fig. 2 is an end view of a nipple having an opening running through the same and Fig. 3 is a side view of the same. This nipple is made of flexible material, preferably rubber, thus permitting of its being expanded when being placed on the faucet or the handle of the brush. Fig. 4 is an end view of the three way connection as is to be used for converging the stream of hot and cold water into one and thence to the place of use, which is the brush. Fig. 5 is a side view of the same three way connection. Fig. 6 is a side view of a connection for joining the nipples with the conduits and Fig. 7 is an end view of the same.

Similar characters refer to similar parts throughout the several views.

The nipples for connecting the conduits with the faucets and the hydraulic tooth brush are shown respectively at 1—1$^a$ and 1$^b$. The dotted lines shown in Fig. 1 illustrate the expansion that takes place when the nipple is placed in position upon the faucet. These nipples have cylindrical bores as shown at 2. These cylindrical bores terminate near the small end of the nipples in bores 2$^a$ of smaller diameter than indicated at 2, forming shoulders 2$^b$ for holding the connections 3 in position. Each connection 3 has an enlarged end or head 3$^a$ which completely fills the bore 2 in the nipple, said head 3$^a$ being firmly held in place in the nipple against the said shoulder 2$^b$. Each connection 3 has a circumferential groove in the end opposite the one on which the enlargement is, the purpose of this being, when a flexible tube or conduit is placed thereon, being expanded at the time, a suction is caused and experience has shown that the conduit is held more firmly.

The numerals 4 and 5 indicate conduits that are joined on to the three way connection 7 on one end and to connections 3 on the other and conduit 6 carries the tempered liquid to the place of use. The three-way connection 7 has grooves 7$^a$ and 7$^b$ near each end.

The numeral 8 represents the handle of the brush into which the liquid is conducted.

Should it be found necessary or advisable to use this conduit in a modified form where the water is tempered before entering the conduit it is evident that this may be accomplished by dispensing with the three way connection and using a conduit having one of my special nipples and connections on each end instead.

The feature of essential importance residing in the present invention consists in the peculiar form of the nipples 1, 1$^a$ and 1$^b$. Each of these nipples is made of flexible rubber as before premised, and the formation in cross-section is peculiar by reason of the special objects of the invention.

It may be noted that in the actual use of the invention the apparatus hereinbefore described is adapted to supply water or a suitable fluid to small outlet orifices or ducts in the bristle end portion of a tooth brush. When the faucet with which the conduit 6 is connected is open, the water pressure in the conduit is extremely great, and I have found that ordinary nipples such as used for bath sprays etc., are not suitable for holding the conduit in connection with the faucet; in fact the conduit itself must be made of special rubber to resist the pressure of the water.

The nipples 1, 1$^a$ and 1$^b$ are formed in a peculiar manner affording the greatest possible gripping action thereof with respect to the faucet, and yet permitting the flexibility of the nipple to accommodate for the application of the same to faucets the discharge spouts of which are curved. As shown in the drawings each of the nipples 1, 1$^a$ and 1$^b$ comprises a tubular body having an opening leading therethrough, said body, however, being formed with a plurality of annular enlargements at intervals of its length, said enlargements being made by thickening the body at such intervals. Between the enlargements of each nipple are thinner flexible portions which permit the nipple to readily flex or give when applied to curved discharge faucets or similar water supply means. The annular enlargements of the nipple are of graduated diameter, and said enlargements cause the nipple to so effectively engage with the discharge spouts of faucets of different sizes as to eliminate likelihood that the flexible conduits with which the nipples are connected will be disengaged from the faucet when the water is being supplied under pressure thereto. The reason the annular enlargements of each nipple are provided in graduated diameters, becoming smaller toward the conduit-connecting end thereof and is due to the fact that the smallest enlargement will serve to grip effectively a comparatively small spout, while the enlargements of greater diameter are designed to effectively engage faucets of larger sizes.

Fig. 1 of the drawings illustrates in dotted lines a curved faucet spout and it will be apparent that were said spout of smaller diameter it would be desirable to force the nipple on the spout so that it curves to conform with the curvature thereof in which event the provision of the flexible portions between the enlargements facilitates the application of the nipple to the spout in an evident manner.

Having fully described my invention, I claim as new and desire to secure by Letters Patent—

As an article of manufacture, a nipple for connecting faucets with conduits, and comprising a body of flexible rubber provided with a longitudinal opening therethrough, the body having integral gripping enlargements at intervals in its length, and of graduated diameters, the portions of the body between the gripping enlargements being comparatively thin so as to bend or flex effectively when the nipple is applied to curved pipe connections or the like.

In testimony that I claim the foregoing as my own I hereunto attach my signature in the presence of two witnesses this 24th day of May, 1909.

FRANK S. SKIFF.

Witnesses:
 ERNEST H. ALLEN,
 ESTYLLE A. ZEYSS.